Patented Oct. 27, 1953

2,657,218

UNITED STATES PATENT OFFICE 2,657,218

METHOD FOR THE PREPARATION OF VISNAGIN FROM CHELLOL AND NEW COMPOSITIONS OF MATTER

Theodore A. Geissman, Los Angeles, Calif.

No Drawing. Application July 30, 1951, Serial No. 239,378

8 Claims. (Cl. 260—345.2)

This invention relates to a novel method for the preparation of visnagin, a naturally occurring material possessing physiological properties, and more particularly possessing coronary dilator activity. This invention further relates to certain new compositions of matter, more particularly, intermediates formed in carrying out the method of this invention for the preparation of visnagin. The new compositions of matter in accordance with this invention are physiologically active and are particularly useful as coronary dilators.

The method of this invention utilizes as a starting material chellol, a compound readily prepared from naturally occurring chellol glucoside by methods well-known to the art.

In proceeding according to this invention, the starting material, chellol, is reacted with a sulfonyl halide to form the sulfonyl ester of chellol, which is then treated with an alkali metal halide to replace the sulfonyl radical with a halogen atom. The halide derivative so formed is then reduced to visnagin with a reducing agent, such as zinc in acetic acid.

The method according to this invention is graphically illustrated as follows:

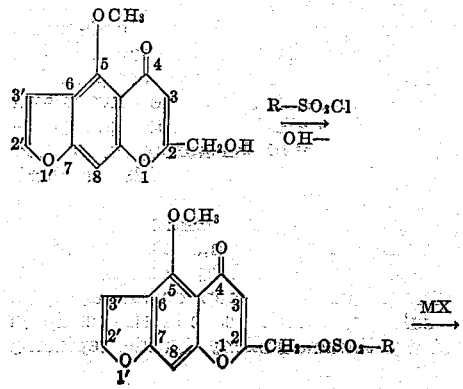

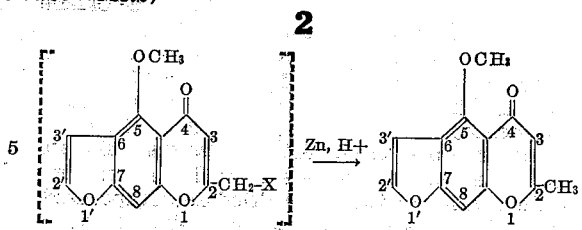

In the above structures, R is an aliphatic or aromatic hydrocarbon radical such as, for example, methyl, phenyl and tolyl radicals; M is an alkali metal, as, for example, sodium and potassium; X is a halogen, as, for example, iodine and bromine.

More particularly, the sulfonyl derivative of chellol will be prepared by reacting equimolar quantities of chellol and a substituted sulfonyl chloride selected from the group consisting of methane sulfonyl chloride, benzene sulfonyl chloride and p-toluene sulfonyl chloride in a suitable solvent such as a water and dioxane mixture and in the presence of an alkali as, for example, sodium hydroxide, potassium hydroxide or sodium bicarbonate, or the like.

The sulfonyl ester so prepared is then treated with an equimolar quantity of an alkali metal halide as, for example, sodium iodide, potassium iodide, or sodium bromide in a suitable solvent, such as acetone, acetic anhydride, or the like, to form the chellol halide, 2-halomethyl-5-methoxy-furano-[6,7:4'5']-chromone, which is then reduced to visnagin with zinc dust and acetic acid.

The preparation of the halide from the sulfonyl ester, followed by reduction of the halide to visnagin may be carried out without isolation of the intermediate halogen product if desired.

The following specific examples will serve to particularly illustrate the method according to this invention:

Example 1

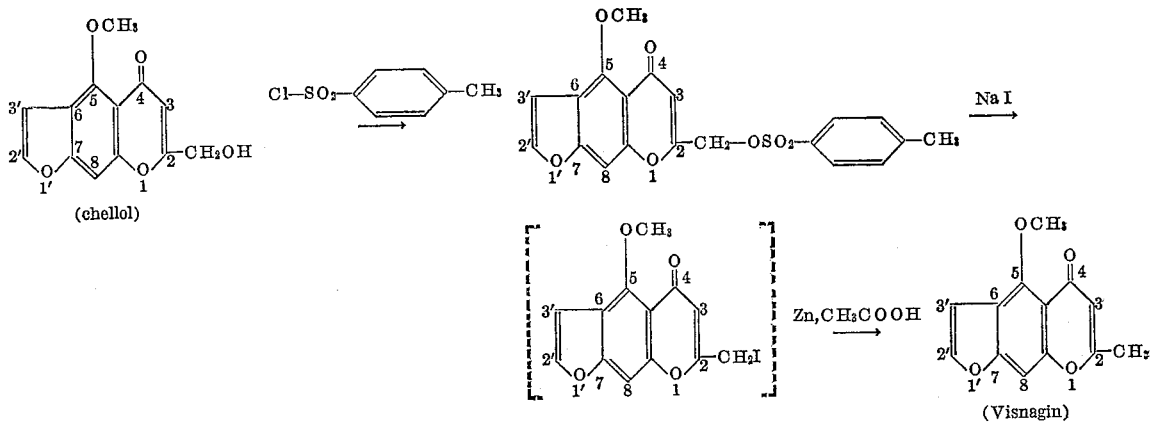

To a mixture of 3.46 g. of chellol and 4.0 g. of p-toluene sulfonyl chloride was added 10 ml. of dioxane, 10 ml. of 6 N NaOH and 10 ml. of water. The solid gradually dissolved upon shaking the solution, during which the two phases turned a yellow brown color. The temperature was controlled by cooling with ice. Crystals began to appear shortly, and after further shaking an excess of water was added and the mixture was thoroughly chilled. The product collected by filtration was crude "chellol tosylate" which upon recrystallization and purification from dilute acetic acid afforded crystalline chellol p-toluene sulfonate melting at 152.5–3° C.

To 280 mg. of the tosylate prepared above, there was added 7.5 ml. of a solution of 30 g. of sodium iodide in 100 ml. of acetone. The solution was heated to boiling and allowed to stand for one hour and filtered. After pouring the filtrate into ether and water, the ether layer was separated, washed with water, dried and evaporated. The iodo compound so obtained, 2-iodo-methyl-5-methoxyfurano-[6,7:4',5']-chromone, had a melting point of 158–159° C. with decomposition.

Zinc dust was added in small portions to a solution of 50 mg. of the above prepared iodo derivative in a few ml. of acetic acid while the solution was kept at the boiling point. Upon filtration of the mixture, and dilution of the filtrate with water, the product separated as colorless needles which, after recrystallization from ethyl acetate/petroleum ether melted at 139–140° C. When this sample of visnagin was admixed with an authentic sample of visnagin, prepared by another means, there was observed no depression of the melting point and its absorption spectrum was in complete agreement.

Example 2

Visnagin was prepared by an alternative procedure, by which the iodo compound was not isolated prior to reduction, in the following manner. To 500 mg. of "chellol tosylate" prepared in Example 1 above as an intermediate, in 5 ml. of acetic anhydride was added a hot solution of 1 g. of sodium iodide in 10 ml. of acetic anhydride. Zinc dust was added in small portions to the resulting brown solution until the color changed to a pale yellow. Filtration of the solution onto ice caused the acetic anhydride to decompose, after which there were formed colorless needles. Collection and recrystallization of the crystalline material from ethyl acetate provided visnagin melting at 138–140° C.

Example 3

Visnagin was prepared by a procedure identical with that described in Example 1, with the exception that 3.70 g. of benzene sulfonyl chloride was utilized in place of the p-toluene sulfonyl chloride to react with chellol, and 7.5 ml. of a solution of 33 g. of potassium iodide in 100 ml. of acetone was utilized to halogenate the sulfonyl ester.

Example 4

Visnagin was prepared by a procedure identical with that described for Example 1, with the exception that 2.4 g. of methane sulfonyl chloride was reacted with chellol in place of the p-toluene sulfonyl chloride to form the sulfonyl ester.

As will be apparent to the skilled chemist, in the preparation of visnagin as exemplified above, substituted sulfonyl halides other than sulfonyl chlorides, as, for example, the corresponding bromides, and the iodides, may be used in place of substituted sulfonyl chlorides for reaction with the starting material chellol. Again, as will be apparent, sodium or potassium chloride or bromide may be substituted for sodium iodide for a reaction with the sulfonyl ester, and the reduction of the halide to visnagin may be carried out using any well known procedure other than by affecting reduction with use of zinc dust and acetic acid. It also will be appreciated that a methane sulfonyl halide or a benzene sulfonyl halide may be substituted for p-toluene sulfonyl chloride in following the procedure of the above examples.

What is claimed is:

1. The method of preparing visnagin which comprises esterifying chellol by reacting chellol with a sulfonyl halide, replacing the sulfonyl radical of the sulfonyl ester with a halogen by reacting the ester with an alkali metal halide, and reducing the chellol halide so formed to visnagin.

2. The method of preparing visnagin which comprises esterifying chellol by reacting chellol with a sulfonyl halide, in a suitable solvent and in the presence of an alkali with cooling, replacing the sulfonyl radical of the sulfonyl ester with a halogen by reacting the ester with an alkali metal halide in a solvent with heating, and reducing the chellol halide so formed to visnagin.

3. The method of preparing visnagin which comprises esterifying chellol by reacting chellol with a member of the group consisting of a methane sulfonyl halide, a benzene sulfonyl halide and a p-toluene sulfonyl halide, replacing the sulfonyl radical of the sulfonyl ester with a halogen by reacting the sulfonyl ester with a member of the group consisting of an alkali metal iodide and an alkali metal bromide, and reducing the chellol halide to visnagin.

4. The method of preparing visnagin which comprises esterifying chellol by reacting chellol with a member of the group consisting of methane sulfonyl chloride, benzene sulfonyl chloride and p-toluene sulfonyl chloride in a solvent in the presence of an alkali with cooling, replacing the sulfonyl radical of the ester with a halogen by reacting the ester with a member of the group consisting of sodium and potassium iodide and sodium and potassium bromide with heating, reducing the chellol halide to visnagin by the addition of zinc dust to the chellol halide in solution in acetic acid with heating.

5. The method of preparing visnagin which comprises esterifying chellol by reacting chellol with a sulfonyl halide, replacing the sulfonyl radical of the sulfonyl ester with iodine by reacting the ester with sodium iodide, and reducing the chellol iodide so formed to visnagin.

6. The method of preparing visnagin which comprises esterifying chellol by reacting chellol with a sulfonyl halide, in a suitable solvent and in the presence of an alkali with cooling, replacing the sulfonyl radical of the sulfonyl ester with iodine by reacting the ester with sodium iodide in a solvent with heating, and reducing the chellol iodide so formed to visnagin.

7. The method of preparing visnagin which comprises esterifying chellol by reacting chellol with a member of the group consisting of methane sulfonyl chloride, benzene sulfonyl chloride and p-toluene sulfonyl chloride in a solvent in the presence of an alkali with cooling, replacing the sulfonyl radical of the ester with iodine by reacting the ester with sodium iodide with heating, reducing the chellol iodide to visnagin by the addition of zinc dust to the chellol iodide in solution in acetic acid with heating.

8. A compound having the following formula:

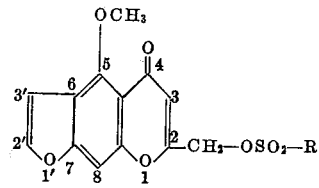

where R is selected from the group consisting of methyl, phenyl and p-tolyl.

THEODORE A. GEISSMAN.

No references cited.